(12) United States Patent
Takeuchi

(10) Patent No.: US 9,841,111 B2
(45) Date of Patent: Dec. 12, 2017

(54) SOLENOID VALVE

(71) Applicant: KYB Corporation, Tokyo (JP)

(72) Inventor: Toru Takeuchi, Kanagawa (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 15/109,663

(22) PCT Filed: Dec. 3, 2014

(86) PCT No.: PCT/JP2014/082014
§ 371 (c)(1),
(2) Date: Jul. 5, 2016

(87) PCT Pub. No.: WO2015/104923
PCT Pub. Date: Jul. 16, 2015

(65) Prior Publication Data
US 2016/0327166 A1    Nov. 10, 2016

(30) Foreign Application Priority Data
Jan. 9, 2014    (JP) ................................. 2014-002137

(51) Int. Cl.
*F16K 1/54*    (2006.01)
*F16K 3/26*    (2006.01)
*F16K 31/40*    (2006.01)

(52) U.S. Cl.
CPC ............... *F16K 3/267* (2013.01); *F16K 1/54* (2013.01); *F16K 31/408* (2013.01)

(58) Field of Classification Search
CPC ... F16K 1/44; F16K 1/443; F16K 1/54; F16K 3/262; F16K 3/265; F16K 3/267; F16K 31/408

USPC ............................................ 251/30.01–30.04
See application file for complete search history.

(56) References Cited

U.S. PATENT DOCUMENTS

| 4,585,206 A |   | 4/1986  | Itoh                         |
|-------------|---|---------|------------------------------|
| 4,746,093 A | * | 5/1988  | Scanderbeg .......... F16K 31/408 |
|             |   |         | 251/30.04                    |
| 4,793,589 A | * | 12/1988 | Eldredge ............... F16K 31/408 |
|             |   |         | 251/30.03                    |
| 5,039,069 A | * | 8/1991  | Friederichs ............. B60T 8/362 |
|             |   |         | 251/30.03                    |

(Continued)

FOREIGN PATENT DOCUMENTS

| CN | 2584964 Y     | 11/2003 |
|----|---------------|---------|
| JP | S61-105381 A  | 5/1986  |

(Continued)

*Primary Examiner* — Eric Keasel
(74) *Attorney, Agent, or Firm* — Rabin & Berdo, P.C.

(57) ABSTRACT

A solenoid valve includes a main poppet configured to control a flow rate of working fluid flowing in a valve passage according to a pilot pressure, an auxiliary poppet configured to adjust the pilot pressure according to the electromagnetic force, and a first seat portion and a second seat portion provided in the valve passage. The main poppet includes a poppet valve seated on the first seat portion and a spool valve slidable in the second seat portion. The spool valve includes an outer peripheral surface slidable relative to the second seat portion and through holes open on the outer surface and configured such that areas thereof exposed from the second seat portion change in accordance with a movement of the spool valve.

6 Claims, 4 Drawing Sheets

(56) References Cited

U.S. PATENT DOCUMENTS 6,612,338 B2 * 9/2003 Weldon ................... F16K 1/44
                                                            137/529
7,614,607 B2 * 11/2009 Stiers ..................... F16K 3/265
                                                            251/340

FOREIGN PATENT DOCUMENTS

JP      H02-127874 U    10/1990
JP      8-1345 Y2       1/1996
JP      2002-039429 A   2/2002

* cited by examiner

SOLENOID VALVE

TECHNICAL FIELD

The present invention relates to a solenoid valve for controlling a flow rate of working fluid according to an electromagnetic force.

BACKGROUND ART

Generally, a valve for controlling a flow rate of working fluid according to an electromagnetic force is used in hydraulically operated construction machines and industrial machines.

JP2002-39429A describes a two-stage pilot electromagnetic valve with a main valve seat allowing communication between an inlet hole and an outlet hole, a main valve body for opening and closing the main valve seat, a first pilot valve seat allowing communication between a back pressure chamber of the main valve body and the outlet hole, a first pilot valve body for opening and closing the first pilot valve seat, a second pilot valve seat allowing communication between a back pressure chamber of the first pilot valve body and the outlet hole and a second pilot valve body for opening and closing the second pilot valve seat by an electromagnetic force.

In this two-stage pilot electromagnetic valve, the large main valve body is driven to open and close by a pilot pressure adjusted in two stages to execute a flow rate control.

SUMMARY OF INVENTION

However, in the two-stage pilot electromagnetic valve described in JP2002-39429A, it is difficult to improve the accuracy of the flow rate control since a degree of change of an opening area defined between the poppet-like main valve body and the main valve seat with respect to a stroke of the main valve body is large.

The present invention aims to improve the accuracy of a flow rate control of a solenoid valve.

According to one aspect of the present invention, a solenoid valve for controlling a flow rate of working fluid flowing in a valve passage according to an electromagnetic force is provided. The solenoid valve includes: a main poppet configured to control the flow rate of the working fluid flowing in the valve passage by moving according to a pilot pressure; an auxiliary poppet configured to adjust the pilot pressure by moving according to the electromagnetic force; and annular first and second seat portions provided in the valve passage; wherein: the main poppet includes a poppet valve configured to close the first seat portion by being seated on the first seat portion and a spool valve slidably provided in the inner periphery of the second seat portion; and the spool valve includes an outer peripheral surface slidable relative to an inner peripheral surface of the second seat portion and a throttle portion open on the outer peripheral surface and configured such that an area thereof exposed from the second seat portion changes in accordance with a movement of the spool valve.

DESCRIPTION OF EMBODIMENTS

Figure 1:
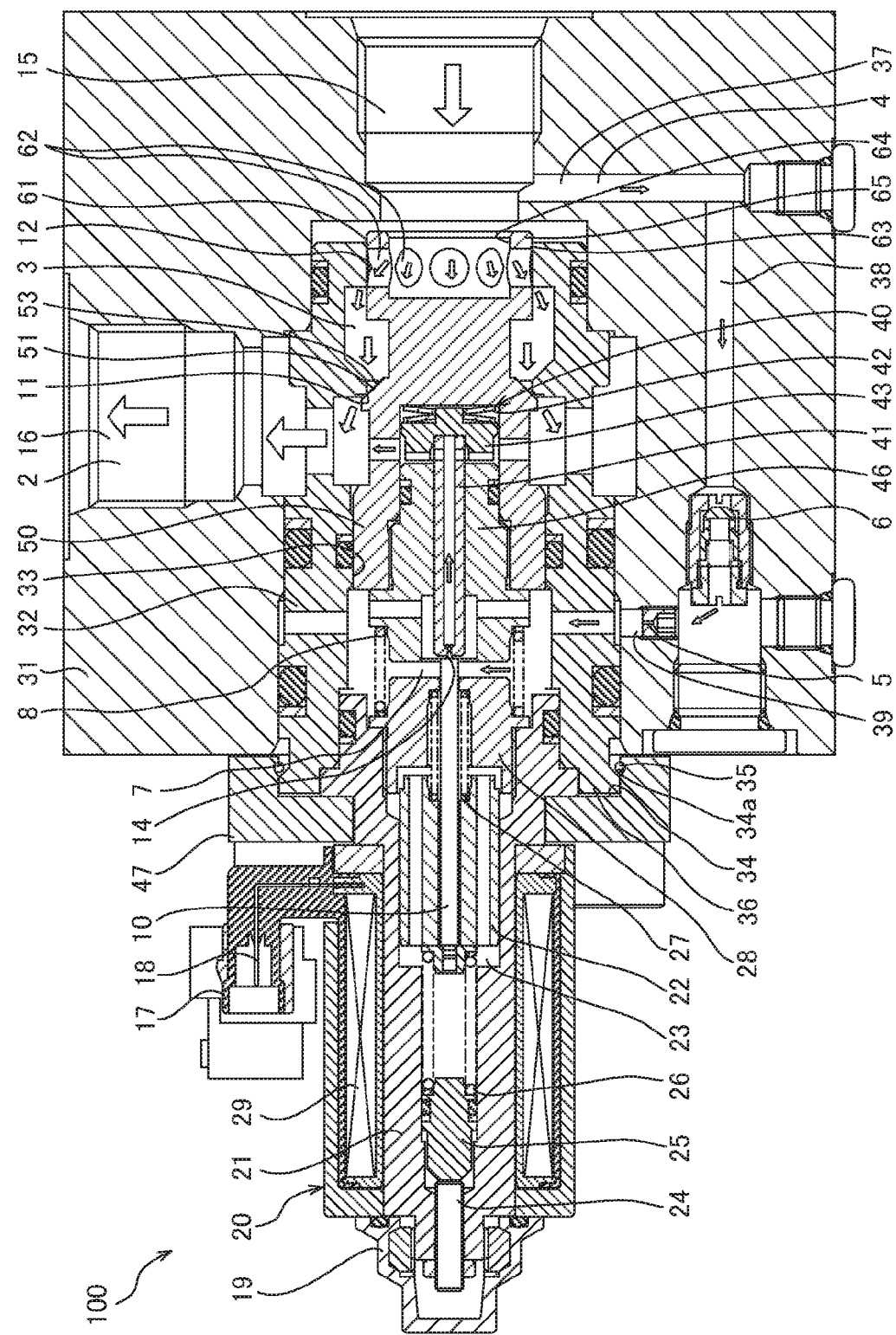
FIG. 1 is a sectional view of a solenoid valve according to a first embodiment of the present invention.

Hereinafter, embodiments of the present invention are described with reference to the drawings.

First Embodiment

A solenoid valve 100 according to a first embodiment of the present invention is described with reference to FIG. 1.

The solenoid valve 100 is provided in a construction machine, an industrial machine or the like and adjusts a flow rate of working fluid supplied to and discharged from an actuator (load) from and to an unillustrated fluid pressure source.

The solenoid valve 100 includes an inlet 15 communicating with the fluid pressure source through an unillustrated pipe or the like, an outlet 16 communicating with the actuator through an unillustrated pipe or the like and a valve passage 2 allowing communication between the inlet 15 and the outlet 16.

In the solenoid valve 100, hydraulic oil is used as the working fluid. It should be noted that the working fluid is not limited to the hydraulic oil and may be other incompressible fluid or compressible fluid. The hydraulic oil flows in the valve passage 2 from the inlet 15 to the outlet 16 as shown by arrows in FIGS. 1 and 2.

The valve passage 2 of the solenoid valve 100 is composed of a main passage 3 which is opened and closed by a main poppet 50 and an auxiliary passage 4 which is opened and closed by an auxiliary poppet 10.

The solenoid valve 100 includes a case 31 with the inlet 15 and the outlet 16 and a housing 32 to be housed into the case 31.

The housing 32 has an inner peripheral surface 33 along which the main poppet 50 is slidably inserted. The main poppet 50 is slidably supported by the inner peripheral surface 33 of the housing 32 and slides in an axial direction to open and close the main passage 3.

Figure 2:
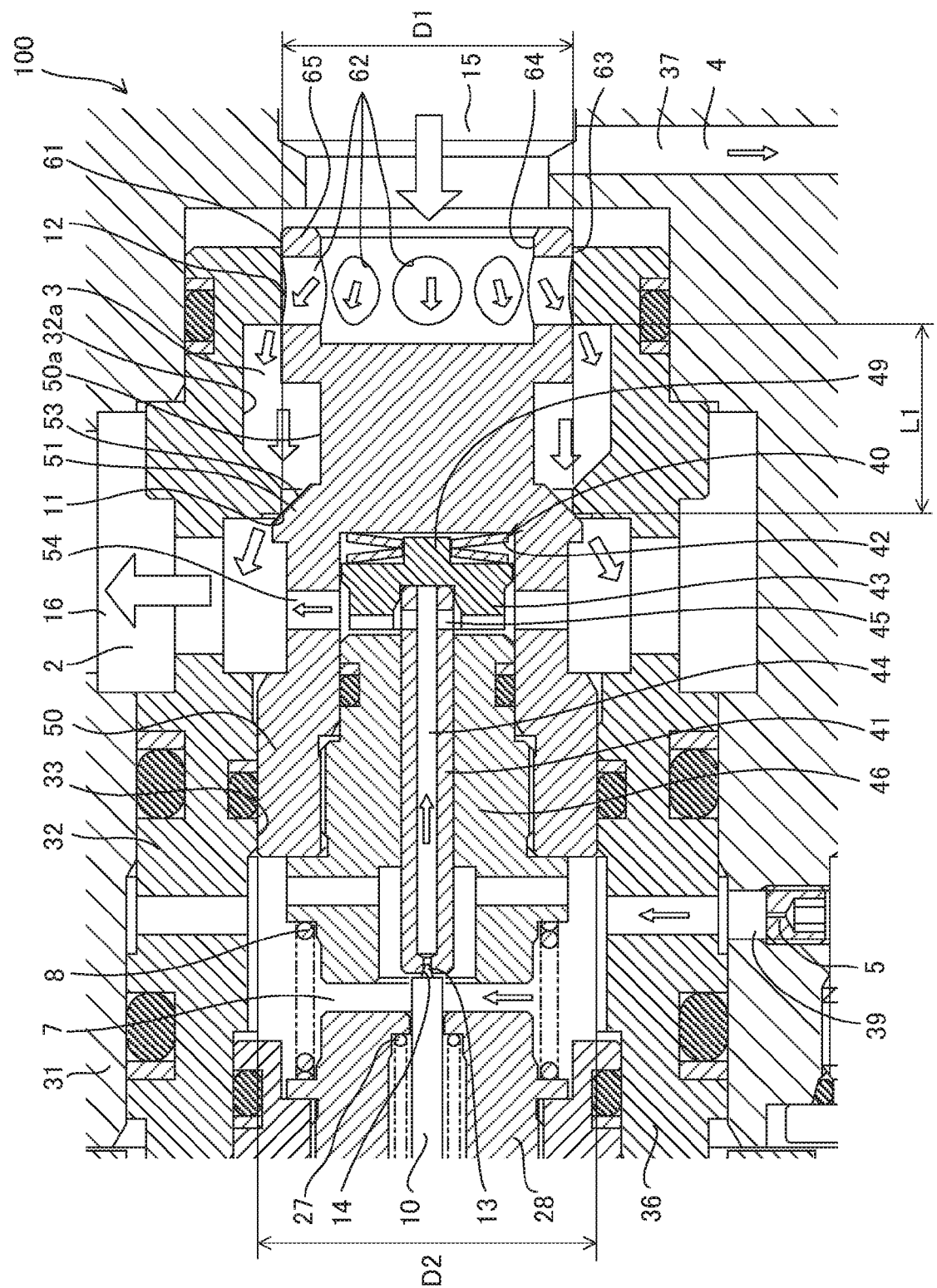
FIG. 2 is a partially enlarged sectional view of the solenoid valve of FIG. 1.

The housing 32 is formed with annular first seat portion 11 and second seat portion 12 on the same center line as the inner peripheral surface 33. The first and second seat portions 11, 12 are provided in the main passage 3. As shown in FIG. 2, diameters of the first seat portion 11 and second seat portion 12 are substantially equal and set at a diameter D1.

The main poppet 50 includes a truncated conical poppet valve 51 for closing the first seat portion 11 by being seated on the first seat portion 11 and a cylindrical spool valve 61 slidably provided in the inner periphery of the second seat portion 12.

The poppet valve 51 has a tapered outer peripheral surface 53 inclined with respect to a center line of the main poppet 50. The main passage 3 is closed by the contact of the outer peripheral surface 53 with the first seat portion 11. In this way, the main poppet 50 can block the main passage 3, leaving no space.

The spool valve 61 has a cylindrical outer peripheral surface 63 extending in parallel to the center line of the main poppet 50. The outer peripheral surface 63 is slidable relative to the inner peripheral surface of the second seat portion 12.

An annular portion 65 slidably provided in the inner periphery of the second seat portion 12 is formed on the tip of the spool valve 61. The annular portion 65 is formed into a cylindrical shape centered on the center line of the main poppet 50 and includes a recess 64 open on the tip surface thereof.

The spool valve 61 is formed with a plurality of through holes 62 arranged side by side in a circumferential direction. The through hole 62 allows communication between the inner periphery and the outer periphery of the annular portion 65 and has one end open on the outer peripheral surface 63 of the spool valve 61 and the other end open on the inner surface of the recess 64. Each through hole 62 is radially formed in a radial direction with the center line of the main poppet 50 as a center.

The shape of opening ends of the through holes 62 open on the outer peripheral surface 63 of the spool valve 61 is arbitrarily set. An opening area of the valve passage 2 with respect to a stroke of the spool valve 61 is determined by the shape of the opening ends of the through holes 62.

Each through hole 62 constitutes a throttle portion whose area exposed from the second seat portion 12 changes in accordance with a movement of the spool valve 61. Specifically, each through hole 62 is gradually opened at a downstream end side of the second seat portion 12 in accordance with a movement of the spool valve 61. Further, each through hole 62 is arranged not to be completely closed by the second seat portion 12 even when the poppet valve 51 is in contact with the first seat portion 11. That is, the opening area by each through hole 62 has a minimum value at a valve closing position where the poppet valve 51 is in contact with the first seat portion 11 as shown in FIG. 1, and gradually increases as the poppet valve 51 is displaced in a valve opening direction. It should be noted that each through hole 62 may be arranged to be closed by the second seat portion 12 until the poppet valve 51 is displaced to a certain degree from the position where the poppet valve 51 is in contact with the first seat portion 11. In this case, the flow rate of the hydraulic oil flowing in the main passage 3 can be set substantially at zero until the main poppet 50 is displaced to a certain degree.

In the valve passage 2, the first seat portion 11 is provided downstream of the second seat portion 12. Thus, the hydraulic oil flowing in the solenoid valve 100 is throttled in a clearance between the main poppet 50 and the first seat portion 11 after being throttled in a clearance between the through holes 62 of the spool valve 61 and the second seat portion 12. Further, a degree of change of the opening area defined between the through holes 62 of the spool valve 61 and the second seat portion 12 with respect to the stroke of the main poppet 50 is set smaller than a degree of change of an opening area defined between the outer peripheral surface 53 of the poppet valve 51 and the first seat portion 11. Thus, the flow rate of the hydraulic oil flowing in the main passage 3 is controlled by the opening area defined between the through holes 62 of the spool valve 61 and the second seat portion 12. It should be noted that although the first seat portion 11 is provided downstream of the second seat portion 12, it may be provided upstream of the second seat portion 12. Also in this case, the flow rate of the hydraulic oil flowing in the main passage 3 is controlled by the opening area defined between the through holes 62 of the spool valve 61 and the second seat portion 12.

Further, to ensure a flow path to the poppet valve 51 for the hydraulic oil having passed through the spool valve 61, an annular recess 50a recessed radially inwardly is formed in a part between the spool valve 61 and the poppet valve 51 of the main poppet 50 and an annular recess 32a recessed radially outwardly is further formed between the first seat portion 11 and the second seat portion 12 of the housing 32.

A pilot pressure chamber 7 is defined behind the main poppet 50. The main poppet 50 is biased in a valve closing direction by a pilot pressure of the pilot pressure chamber 7 receiving on the back surface thereof and a spring force of a main return spring 8. When the main poppet 50 slides leftward in FIGS. 1 and 2 against the spring force of the main return spring 8 due to a differential pressure between the pilot pressure and a supply pressure introduced to the inlet 15, the poppet valve 51 is separated from the first seat portion 11.

The pilot pressure chamber 7 is provided on the auxiliary passage 4. An orifice 5 is provided on an upstream end of the pilot pressure chamber 7 in the auxiliary passage 4. An auxiliary seat portion 14 is provided on a downstream end of the pilot pressure chamber 7 in the auxiliary passage 4.

In the auxiliary passage 4, the hydraulic oil successively flows through the orifice 5, the pilot pressure chamber 7 and the auxiliary seat portion 14. The pilot pressure in the pilot pressure chamber 7 is adjusted by displacing the auxiliary poppet 10 seated on the auxiliary seat portion 14 to change an opening area of the auxiliary seat portion 14.

The solenoid valve 100 includes a solenoid mechanism 20 for generating a thrust force for displacing the auxiliary poppet 10.

The solenoid mechanism 20 includes a cylindrical solenoid case 21 coupled to the case 31, a plunger 22 slidably housed in the solenoid case 21 and a coil 29 provided outside the solenoid case 21.

A tip part of the solenoid case 21 is fitted into the housing 32. Further, a flange 47 is arranged to be engaged with the outer periphery of the solenoid case 21. The flange 47 is fastened to the case 31 via a plurality of unillustrated bolts. The solenoid case 21 and the housing 32 are fixed between the flange 47 and the case 31 while being held in contact with each other.

A recess 34 for housing an end part of the housing 32 is formed on a side surface of the flange 47 on the side of the case 31. An inner peripheral groove 34a into which a snap ring 35 is to be fitted is formed on the inner peripheral surface of the recess 34. This snap ring 35 is engaged with a flange portion 36 formed on the end part of the housing 32 and the end part of the housing 32 is held in the recess 34 of the flange 47. By holding the housing 32 by the flange 47 in this way, the solenoid mechanism 20 and the housing 32 are assembled.

The auxiliary poppet 10 is coupled to the plunger 22, and the plunger 22 is housed in a plunger chamber 23 defined inside the solenoid case 21. The plunger chamber 23 communicates with the pilot pressure chamber 7 and the pilot pressure is introduced thereto.

An adjuster screw 24 is fastened to an end part of the solenoid case 21. A retainer 25 configured to come into contact with the adjuster screw 24 is slidably disposed in the solenoid case 21. A coiled auxiliary return spring 26 is interposed between the retainer 25 and an end part of the auxiliary poppet 10. A spring force of the auxiliary return spring 26 is adjusted by changing a screwed position of the adjuster screw 24. An end part of the adjuster screw 24 projecting from the solenoid case 21 is covered by a cover 19 mounted on the solenoid case 21.

A cylindrical block 28 is mounted on an opening end part of the solenoid case 21. The block 28 has a function of guiding the auxiliary poppet 10 to the auxiliary seat portion 14 while holding a center of the auxiliary poppet 10 so that the auxiliary poppet 10 is reliably seated on the auxiliary seat portion 14. A coiled opposite return spring 27 is interposed between the plunger 22 and the block 28. Further, the coiled main return spring 8 is interposed between the block 28 and a cylindrical guide 46 mounted in the main poppet 50.

The auxiliary poppet 10 is biased in a valve closing direction (rightward direction in FIG. 1) by a difference between the pilot pressure receiving on the back surface thereof and spring forces of the auxiliary return spring 26 and the opposite return spring 27.

An excitation current is introduced to the coil 29 through an unillustrated lead wire and a terminal 18 connected to a connector 17. The auxiliary poppet 10 moves leftward in FIG. 1 to be separated from the auxiliary seat portion 14 when a thrust force generated by a magnetic field of the coil 29 becomes larger than the sum of a valve closing force by the pilot pressure and the spring forces of the auxiliary return spring 26 and the opposite return spring 27.

The solenoid valve 100 includes a pressure compensating mechanism 40 for adjusting a biasing force of the auxiliary return spring 26 such that the thrust force for moving the auxiliary poppet 10 is substantially constant even if the pilot pressure introduced into the pilot pressure chamber 7 changes.

The pressure compensating mechanism 40 includes a pressure compensating sleeve 41 slidably disposed in the guide 46 and a pressure compensating spring 42 for biasing the pressure compensating sleeve 41.

The auxiliary seat portion 14 is formed on the base end of the pressure compensating sleeve 41. An auxiliary poppet valve 13 provided on the tip of the auxiliary poppet 10 is seated on the auxiliary seat portion 14 as shown in FIG. 2.

A disc-shaped spring receiver 43 is coupled to a tip part of the pressure compensating sleeve 41. The disc-spring-shaped pressure compensating spring 42 is interposed between the spring receiver 43 and the main poppet 50. The pressure compensating sleeve 41 compresses the pressure compensating spring 42 via the spring receiver 43 by the pilot pressure receiving on the base end surface thereof.

The auxiliary return spring 26, the auxiliary poppet 10, the opposite return spring 27, the pressure compensating sleeve 41, the spring receiver 43 and the pressure compensating spring 42 are arranged side by side on the same center line.

As shown in FIG. 2, the spring receiver 43 includes a cylindrical projection 49 projecting from the tip surface thereof. The pressure compensating spring 42 composed of two disc springs is supported on the same center as the pressure compensating sleeve 41 by having the projection 49 inserted into the inner periphery thereof. Further, the spring receiver 43 also has a function as a stopper for regulating a displacement of the pressure compensating sleeve 41 in the axial direction.

When the pilot pressure increases, the pressure compensating sleeve 41 moves rightward in FIGS. 1 and 2 together with the auxiliary poppet 10 against the pressure compensating spring 42. At this time, the auxiliary return spring 26 extends and the biasing force by the auxiliary return spring 26 is reduced. As just described, the biasing force of the auxiliary return spring 26 is reduced when the pilot pressure increases, wherefore an increase of the thrust force required to move the auxiliary poppet 10 can be suppressed.

Further, as shown in FIG. 2, the pressure compensating sleeve 41 is formed with through holes 44, 45 constituting the auxiliary passage 4. The aforementioned auxiliary seat portion 14 is formed on one end of the through hole 44.

A through hole 54 constituting the auxiliary passage 4 is formed in a part of the main poppet 50 downstream of the poppet valve 51. When the auxiliary poppet 10 is separated from the auxiliary seat portion 14, the hydraulic oil in the pilot pressure chamber 7 flows to the outlet 16 through these through holes 44, 45 and 54.

Through holes 37, 38 and 39 constituting the auxiliary passage 4 are formed in the case 31. The through hole 37 communicates with the inlet 15. A check valve 6 is disposed in the through hole 38. The check valve 6 hinders a reverse flow of the hydraulic oil from an outflow side to an inflow side of the auxiliary passage 4. The orifice 5 is disposed in the through hole 39. The through hole 39 communicates with the pilot pressure chamber 7 via the orifice 5.

Next, the operation of the solenoid valve 100 will be described.

When the coil 29 is in a non-energized state, the auxiliary poppet 10 is seated on the auxiliary seat portion 14 to block the auxiliary passage 4. At this time, the pressure in the pilot pressure chamber 7 is equal to the pressure of the hydraulic oil supplied to the inlet 15. That is, the pressure equal to the pressure of the hydraulic oil supplied to the inlet 15 acts on the back surface of the main poppet 50. Thus, the main poppet 50 is biased in the valve closing direction by the differential pressure between the pilot pressure and the supply pressure introduced to the inlet 15 and the spring force of the main return spring 8. Then, the poppet valve 51 of the main poppet 50 is seated on the first seat portion 11, thereby blocking the main passage 3. As just described, when the coil 29 is in the non-energized state, the flow of the hydraulic oil is blocked by the solenoid valve 100.

On the other hand, when the coil 29 is in an energized state, the auxiliary poppet 10 is separated from the auxiliary seat portion 14 by the thrust force generated by the solenoid mechanism 20 and the auxiliary passage 4 is opened. This causes the hydraulic oil introduced into the pilot pressure chamber 7 from the inlet 15 through the orifice 5 to flow to the outlet 16 through the auxiliary seat portion 14. In this way, the pilot pressure in the pilot pressure chamber 7 is reduced by the communication of the pilot pressure chamber 7 with the outlet 16. When the differential pressure between the pilot pressure and the supply pressure introduced to the inlet 15 exceeds the spring force of the main return spring 8, the poppet valve 51 of the main poppet 50 is separated from the first seat portion 11 to open the main passage 3. As a result, the hydraulic oil flows from the inlet 15 to the outlet 16 through spaces between the through holes 62 and the second seat portion 12 and between the poppet valve 51 and the first seat portion 11.

When the current flowing in the coil 29 increases to further separate the auxiliary poppet 10 from the auxiliary seat portion 14, a flow rate of the hydraulic oil flowing in the auxiliary passage 4 increases and the pilot pressure of the pilot pressure chamber 7 is further reduced. Then, the main poppet 50 moves according to a reduction of the pilot pressure and the areas of the through holes 62 of the spool valve 61 exposed from the second seat portion 12 increase, whereby the flow rate of the hydraulic oil passing in the main passage 3 increases.

Figure 3:
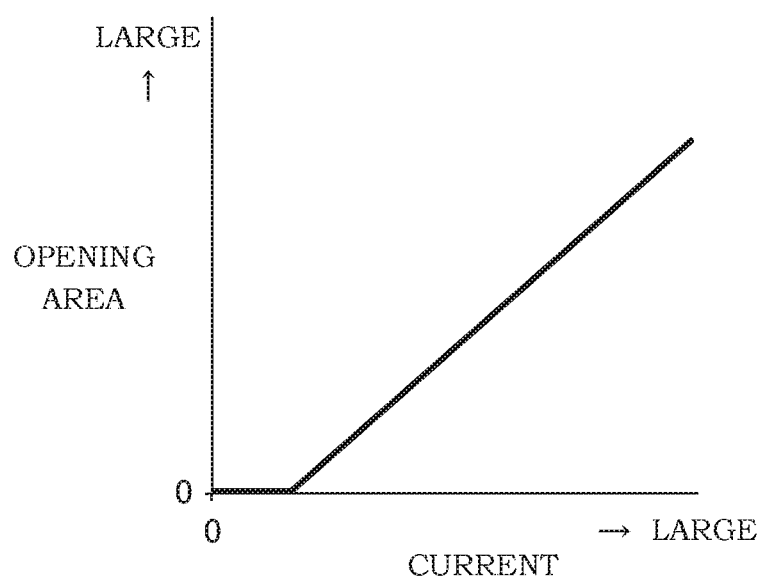
FIG. 3 is a characteristic diagram showing a relationship between the value of a current flowing in a coil and an opening area of the solenoid valve.

As shown in FIG. 3, the solenoid valve 100 is set to have such a characteristic that the opening area of the valve passage 2 in the auxiliary poppet 10 increases in proportion to the value of the current flowing in the coil 29. It should be noted that the characteristic shown in FIG. 3 is only illustrative and a relationship between the value of the current flowing in the coil 29 and the opening area of the valve passage 2 in the auxiliary poppet 10 can be arbitrarily set by changing the arrangement, the shape and the number of the through holes 62. For example, a degree of freedom in setting a flow rate characteristic of the solenoid valve 100 can be improved, for example, by providing a section where the opening area increases like a quadratic curve, a section where a constant value is maintained or the like.

According to the above first embodiment, the following functions and effects are exhibited.

In the above solenoid valve 100, the sealability of the valve passage 2 by the main poppet 50 is ensured since the valve passage 2 is closed by the poppet valve 51 seated on the first seat portion 11. Further, the accuracy of the flow rate control of the hydraulic oil flowing in the valve passage 2 is improved since the opening areas of the through holes 62 exposed from the second seat portion 12 are changed by a sliding movement of the spool valve 61 in the second seat portion 12. Furthermore, production cost can be reduced and performance can be stabilized since the number of springs for the solenoid valve 100 is small and the number of sliding parts is small as compared to conventional two-stage pilot electromagnetic valves.

Further, the hydraulic oil before passing through the first seat portion 11 is introduced to the second seat portion 12 and the flow rate of the hydraulic oil is controlled by the spool valve 61. Thus, a sufficient opening area of the valve passage 2 can be ensured and a degree of change of the opening area of the valve passage 2 with respect to the stroke of the spool valve 61 can be arbitrarily set by changing the number and the shape of the through holes 62 formed on the annular portion 65 slidably provided in the inner periphery of the second seat portion 12.

Further, since the second seat portion 12 is provided upstream of the first seat portion 11, the annular portion 65 inserted through the second seat portion 12 is provided on the tip side of the main poppet 50. Thus, the through holes 62 provided in the annular portion 65 can be easily formed.

Further, the pilot pressure in the pilot pressure chamber 7 changes according to a displacement amount of the auxiliary poppet 10 relative to the auxiliary seat portion 14. Thus, an opening of the main poppet 50 can be changed by controlling the displacement amount of the auxiliary poppet 10. Further, since the hydraulic oil whose flow rate is controlled by the auxiliary poppet 10 in the auxiliary passage 4 and the hydraulic oil whose flow rate is controlled by the main poppet 50 in the main passage 3 join in the valve passage 2, the flow rate of the hydraulic oil flowing in the valve passage 2 can be controlled.

Further, since the reverse flow of the hydraulic oil in the auxiliary passage 4 is hindered by the check valve 6, a reverse flow of the hydraulic oil in the valve passage 2 can also be prevented.

Further, as the pilot pressure biasing the auxiliary poppet 10 in the valve closing direction increases, the auxiliary seat portion 14 and the pressure compensating sleeve 41 move together with the auxiliary poppet 10. Thus, an increase of the thrust force required to move the auxiliary poppet 10 can be suppressed. Furthermore, since the displacement amount of the auxiliary poppet 10, i.e. an opening degree of the auxiliary seat portion 14 does not change even if the differential pressure between the inflow side pressure and the outflow side pressure changes, the solenoid valve 100 can be easily controlled.

Further, the pressure compensating mechanism 40 is so configured that the pressure compensating spring 42 composed of a plurality of disc springs is interposed in series between the spring receiver 43 and the main poppet 50. Since the pressure compensating mechanism 40 has a small number of sliding parts in this way, a hysteresis can be suppressed to be small.

Further, since the diameter of the second seat portion 12 is set equal to that of the first seat portion 11, the seat portions can be easily processed. Further, as compared to the case where the diameter of the second seat portion 12 is smaller than that of the first seat portion 11, the outer diameter of the spool valve 61 slidable in the second seat portion 12 is larger. Thus, it is possible to increase the number of the through holes 62 formed in the spool valve 61 and make the diameter of the through holes 62 larger. Therefore, a range of the controllable flow rate can be enlarged.

Second Embodiment

Figure 4:
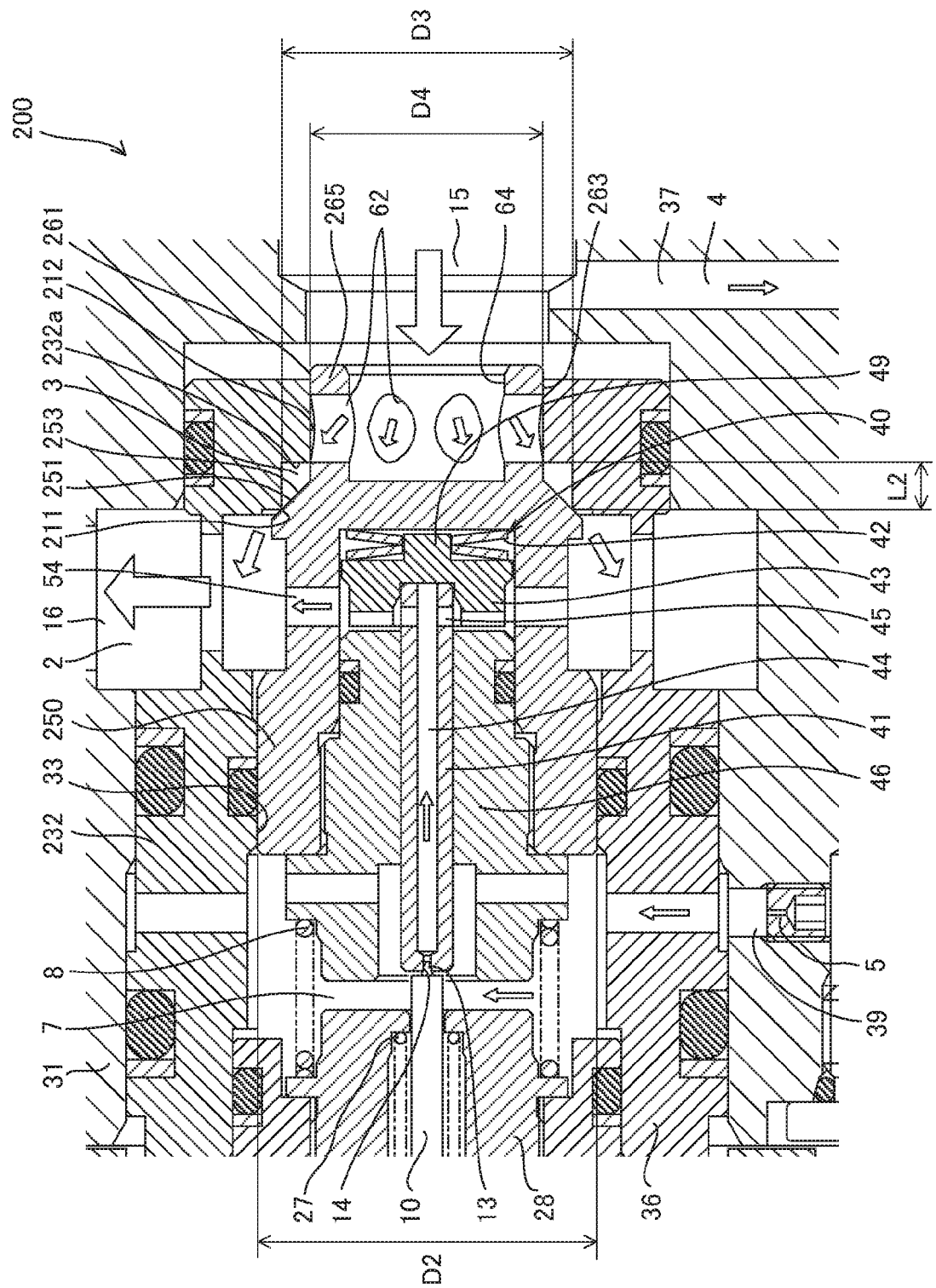
FIG. 4 is an enlarged sectional view showing a part of a solenoid valve according to a second embodiment of the present invention.

Next, a solenoid valve 200 according to a second embodiment of the present invention is described with reference to FIG. 4. The following description is given, centering on points of difference from the first embodiment and components similar to those of the first embodiment are denoted by the same reference signs and not described.

A basic configuration of the solenoid valve 200 is similar to that of the solenoid valve 100 according to the first embodiment. The solenoid valve 200 differs from the solenoid valve 100 in that a diameter of the first seat portion 211 and a diameter of the second seat portion 212 are different. A specific configuration of the solenoid valve 200 according to the second embodiment is described below in comparison to the solenoid valve 100 according to the first embodiment.

In the solenoid valve 100, the first seat portion 11 and the second seat portion 12 are set to have the same diameter D1 as shown in FIG. 2. In contrast, as shown in FIG. 4, a diameter D4 of the second seat portion 212 in which a spool valve 261 is slidably inserted is set smaller than a diameter D3 of the first seat portion 211 on which a poppet valve 251 is seated in the solenoid valve 200.

Further, in the solenoid valve 100, the annular recess 50a recessed radially inwardly is formed in the part between the spool valve 61 and the poppet valve 51 of the main poppet 50 to ensure the flow path to the poppet valve 51 for the hydraulic oil having passed through the spool valve 61 and the annular recess 32a recessed radially outwardly is further formed in the part between the first seat portion 11 and the second seat portion 12 of the housing 32.

In contrast, no recess is provided between the spool valve 261 and the poppet valve 251 in a main poppet 250 of the solenoid valve 200 and an outer peripheral surface 253 of the poppet valve 251 and an outer peripheral surface 263 of the spool valve 261 are continuously formed. Further, between the first seat portion 211 and second seat portion 212 of the housing 232, no recess is provided and only a step portion 232a is formed due to a difference between the diameters of the first seat portion 211 and second seat portion 212.

Since hydraulic oil having passed through the spool valve 261 flows along the outer peripheral surface 263 of the spool valve 261 and the outer peripheral surface 253 of the poppet valve 251 and reaches the poppet valve 251 in the solenoid valve 200, it is not necessary to separately form a flow path. Thus, the shapes of the main poppet 250 and the housing 232 can be simplified as described above.

Further, since no flow path is formed between the poppet valve 251 and the spool valve 261 of the main poppet 250 in the solenoid valve 200, an inter-seat distance L2 from a downstream end of the second seat portion 212 to the first seat portion 211 is set shorter than an inter-seat distance L1 in the solenoid valve 100. As a result, in the solenoid valve 200, the entire length of the solenoid valve 200 can be shortened.

It should be noted that the diameter of the first seat portion 11, 211 is set smaller than an outer diameter D2 of the main poppet 50, 250 in each embodiment. This is to improve responsiveness during valve closing by making an area of the back surface of the main poppet 50, 250, on which the pilot pressure is acting, larger than a cross-sectional area of the first seat portion 11, 211.

According to the above second embodiment, the following effects are exhibited.

In the solenoid valve 200, the distance between the first seat portion 211 and second seat portion 212 can be shortened by setting the diameter D4 of the second seat portion 212 smaller than the diameter D3 of the first seat portion 211. As a result, the entire length of the solenoid valve 200 can be shortened.

Further, the main poppet 250 and the housing 232 are not formed with recesses or the like that serve as a flow path and the shapes thereof are simplified. Thus, the production cost of the solenoid valve 200 can be reduced.

Embodiments of the present invention were described above, but the above embodiments are merely examples of applications of the present invention, and the technical scope of the present invention is not limited to the specific constitutions of the above embodiments.

For example, notch grooves in the form of tapered grooves open on the outer peripheral surface 63, 263 may be provided together with the hole-shaped through holes 62 as the throttle portion open on the outer peripheral surface 63, 263 of the spool valve 61, 261. Further, only notch grooves in the form of tapered grooves open on the outer peripheral surface 63, 263 may be provided as the throttle portion open on the outer peripheral surface 63, 263 of the spool valve 61, 261 without providing the hole-shaped through holes 62.

This application claims priority based on Japanese Patent Application No. 2014-2137 filed with the Japan Patent Office on Jan. 9, 2014, the entire contents of which are incorporated into this specification.

LIST OF REFERENCE SIGNS 100, 200 . . . solenoid valve, 2 . . . valve passage, 3 . . . main passage, 4 . . . auxiliary passage, 5 . . . orifice, 6 . . . check valve, 7 . . . pilot pressure chamber, 10 . . . auxiliary poppet, 11, 211 . . . first seat portion, 12, 212 . . . second seat portion, 14 . . . auxiliary seat portion, 41 . . . pressure compensating sleeve, 42 . . . pressure compensating spring, 50, 250 . . . main poppet, 51, 251 . . . poppet valve, 61, 261 . . . spool valve, 62 . . . through hole (throttle portion), 63, 263 . . . outer peripheral surface, 65, 265 . . . annular portion, D1 . . . diameters of first and second seat portions 11, 12, D2 . . . outer diameter of main poppets 50, 250, D3 . . . diameter of first seat portion 211, D4 . . . diameter of second seat portion 212, L1, L2 . . . inter-seat distance

The invention claimed is:

1. A solenoid valve for controlling a flow rate of working fluid flowing in a valve passage according to an electromagnetic force, comprising:
a main poppet configured to control the flow rate of the working fluid flowing in the valve passage by moving according to a pilot pressure;
an auxiliary poppet configured to adjust the pilot pressure by moving according to the electromagnetic force; and
annular first and second seat portions provided in the valve passage;
wherein:
the main poppet includes a poppet valve configured to close the first seat portion by being seated on the first seat portion and a spool valve slidably provided in the inner periphery of the second seat portion; and
the spool valve includes an outer peripheral surface slidable relative to an inner peripheral surface of the second seat portion and a throttle portion open on the outer peripheral surface and configured such that an area thereof exposed from the second seat portion changes in accordance with a movement of the spool valve;
the first seat portion is provided downstream of the second seat portion;
the spool valve includes an annular portion slidably provided in the inner periphery of the second seat portion; and
the throttle portion is a through hole provided in the annular portion and allowing communication between the inner periphery and the outer periphery of the annular portion.

2. The solenoid valve according to claim 1, wherein:
the valve passage includes a main passage configured to be opened and closed by the poppet valve seated on the first seat portion and an auxiliary passage branched off from the main passage;
an orifice configured to throttle the flow of the working fluid and the auxiliary poppet provided downstream of the orifice and configured to open and close the auxiliary passage by being seated on an auxiliary seat portion are provided in the auxiliary passage; and
a pilot pressure chamber is provided between the orifice and the auxiliary seat portion, the pilot pressure being introduced into the pilot pressure chamber.

3. The solenoid valve according to claim 2, wherein:
a check valve configured to hinder a reverse flow of the working fluid from an outflow side to an inflow side of the auxiliary passage is provided in the auxiliary passage.

4. The solenoid valve according to claim 2, further comprising a pressure compensating sleeve slidably disposed in the main poppet, wherein:
the auxiliary seat portion is provided in the pressure compensating sleeve; and
a pressure compensating spring is interposed between the pressure compensating sleeve and the main poppet.

5. The solenoid valve according to claim 1, wherein:
a diameter of the second seat portion is set equal to that of the first seat portion.

6. The solenoid valve according to claim 1, wherein:
a diameter of the second seat portion is set smaller than that of the first seat portion.

* * * * *